United States Patent
Lee et al.

(10) Patent No.: US 9,276,838 B2
(45) Date of Patent: Mar. 1, 2016

(54) SOFTWARE DEFINED NETWORK VIRTUALIZATION UTILIZING SERVICE SPECIFIC TOPOLOGY ABSTRACTION AND INTERFACE

(71) Applicant: Futurewei Technologies, Inc., Plano, TX (US)

(72) Inventors: Young Lee, Plano, TX (US); Greg Bernstein, Fremont, CA (US)

(73) Assignee: Futurewei Technologies, Inc., Plano, TX (US)

(*) Notice: Subject to any disclaimer, the term of this patent is extended or adjusted under 35 U.S.C. 154(b) by 192 days.

(21) Appl. No.: 14/022,676

(22) Filed: Sep. 10, 2013

(65) Prior Publication Data

US 2014/0098673 A1    Apr. 10, 2014

Related U.S. Application Data

(60) Provisional application No. 61/710,501, filed on Oct. 5, 2012.

(51) Int. Cl.

| | |
|---|---|
| *H04L 12/733* | (2013.01) |
| *H04L 12/24* | (2006.01) |
| *H04L 12/751* | (2013.01) |
| *H04L 12/715* | (2013.01) |
| *H04L 12/735* | (2013.01) |

(52) U.S. Cl.
CPC .............. *H04L 45/126* (2013.01); *H04L 41/12* (2013.01); *H04L 45/02* (2013.01); *H04L 45/64* (2013.01); *H04L 45/1283* (2013.01)

(58) Field of Classification Search
None
See application file for complete search history.

(56) References Cited

U.S. PATENT DOCUMENTS

| | | | |
|---|---|---|---|
| 2006/0067235 A1* | 3/2006 | Acharya et al. | 370/238 |
| 2008/0219268 A1* | 9/2008 | Dennison | 370/395.2 |
| 2010/0128640 A1 | 5/2010 | Okamoto | |
| 2011/0019674 A1* | 1/2011 | Iovanna et al. | 370/392 |

(Continued)

FOREIGN PATENT DOCUMENTS

WO    2009118050 A1    10/2009

OTHER PUBLICATIONS

Dhody et al., "Cross Stratum Optimization (CSO) Enabled PCE Architecture", 2012, IEEE, 10th IEEE International Symposium on Parallel and Distributed Processing with Applications.*

(Continued)

*Primary Examiner* — Ayaz Sheikh
*Assistant Examiner* — Peter Chau
(74) *Attorney, Agent, or Firm* — Conley Rose, P.C.; Grant Rodolph; Brandt D. Howell

(57) ABSTRACT

A computer program product comprising computer executable instructions stored on a non-transitory computer readable medium such that when executed by a processor cause a service specific virtual topology base, positioned in a network stratum, to receive a virtual service negotiation initiation message from an application stratum component, wherein the initiation message comprises a plurality of network source addresses, a plurality of network destination addresses, and a service specific objective, obtain a plurality of computed network paths that traverse a network of network stratum Network Elements (NEs) between the network source addresses and the network destination addresses and meet the service specific objective, and calculate service specific virtual topology that abstractly represents the computed service specific network paths.

14 Claims, 10 Drawing Sheets

(56) References Cited

U.S. PATENT DOCUMENTS

| | | | |
|---|---|---|---|
| 2012/0044835 A1* | 2/2012 | Wang et al. | 370/255 |
| 2012/0054347 A1* | 3/2012 | Lee et al. | 709/226 |
| 2012/0166674 A1* | 6/2012 | Feng et al. | 709/241 |
| 2012/0213079 A1* | 8/2012 | Conway | 370/238 |
| 2012/0308225 A1* | 12/2012 | Long et al. | 398/13 |
| 2013/0188493 A1* | 7/2013 | Numata | 370/235 |

OTHER PUBLICATIONS

Dhody et al., "Cross Stratum Optimization enabled Path Computation", Mar. 25-30, 2012, IETF, 83rd IETF.*

Dhody et al., "Cross Stratum Optimization enabled Path Computation", Mar. 8, 2012, IETF.*

Dhody et al., "Cross Stratum Optimization enabled Path Computation", Sep. 9, 2012, IETF.*

Lee et al., "Problem Statement for Network Stratum Query", Apr. 20, 2011, IETF.*

"Use Case 2b: Service Provider Data Center Interconnection (DCI), Optical Transport WG", Open Networking Foundation, 2013, 16 pages.

Bernstein, G., et al., "Enabling High Bandwidth Networking as a Service (NaaS)," IEEE, Apr. 24, 2013, 10 pages.

Foreign Communication From a Counterpart Application, PCT Application No. PCT/US2013/063527, International Search Report dated Jan. 24, 2014, 4 pages.

Foreign Communication From a Counterpart Application, PCT Application No. PCT/US2013/063527, Written Opinion dated Jan. 24, 2014, 5 pages.

* cited by examiner

SOFTWARE DEFINED NETWORK VIRTUALIZATION UTILIZING SERVICE SPECIFIC TOPOLOGY ABSTRACTION AND INTERFACE

CROSS-REFERENCE TO RELATED APPLICATION

The present application claims priority to U.S. Provisional Patent Application 61/710,501, filed Oct. 5, 2012 by Young Lee, et. al., and entitled "Software Defined Network Virtualization System with Service Specific Topology Abstraction and Interface," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Network carriers, also sometimes referred to as telecommunications operators or communications service providers, that operate existing networks may desire to optimize network utilization for passing traffic, such as Internet Protocol (IP) traffic, over the lower layers of the network, e.g. across Open Systems Interconnection (OSI) model layers 1 to 5 of the network. The optimized traffic may include traffic for triple play services (e.g. Video, Voice, and/or Data) and any type of bulk data transfer. In existing networks, end-to-end services are typically set-up by Operational Support Systems (OSS) or provider specific network management service applications. Network carriers have suggested scenarios for optimizing network utilization and traffic, such as optimizing existing network services and enabling new/emerging network application services.

SUMMARY

In one embodiment, the disclosure includes a service specific virtual topology base positioned in a network stratum. The service specific virtual topology base may receive a virtual service negotiation initiation from an application stratum component. The request may comprise a plurality of network source addresses, a plurality of network destination addresses, and a service specific objective. The service specific virtual topology base may obtain a plurality of computed network paths that traverse a network of network stratum Network Elements (NEs) between the network source addresses and the network destination addresses and meet the service specific objective. The service specific virtual topology base may then calculate a service specific virtual topology that abstractly represents the computed service specific network paths.

In another embodiment, the disclosure includes an apparatus comprising a receiver configured to receive a virtual network service initiation message from an application stratum component. The request may comprise one or more source addresses, one or more destination addresses, and a service specific objective. The apparatus may further comprise a processor coupled to the receiver and configured to calculate a service specific virtual topology that abstractly represents a network of network stratum NEs connecting the source addresses and the destination addresses based on the service specific objective. The apparatus may also comprise a transmitter coupled to the processor and configured to transmit the service specific virtual topology to the application stratum component.

In another embodiment, the disclosure includes a method implemented in a Provider Network Controller (PNC). The PNC may negotiate with a Data Center (DC) controller to identify a set of endpoints that a DC wishes to connect. The PNC may receive traffic characteristics from the DC controller that should be supported between the endpoints by a Virtual Network Topology (VNT). The PNC may also initiate a request to a path computation entity and receive a topology generated by a k-shortest path algorithm based on a service objective function related to the traffic characteristics. The PNC may then provide the VNT based on an abstraction of the topology in response to the DC controller.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
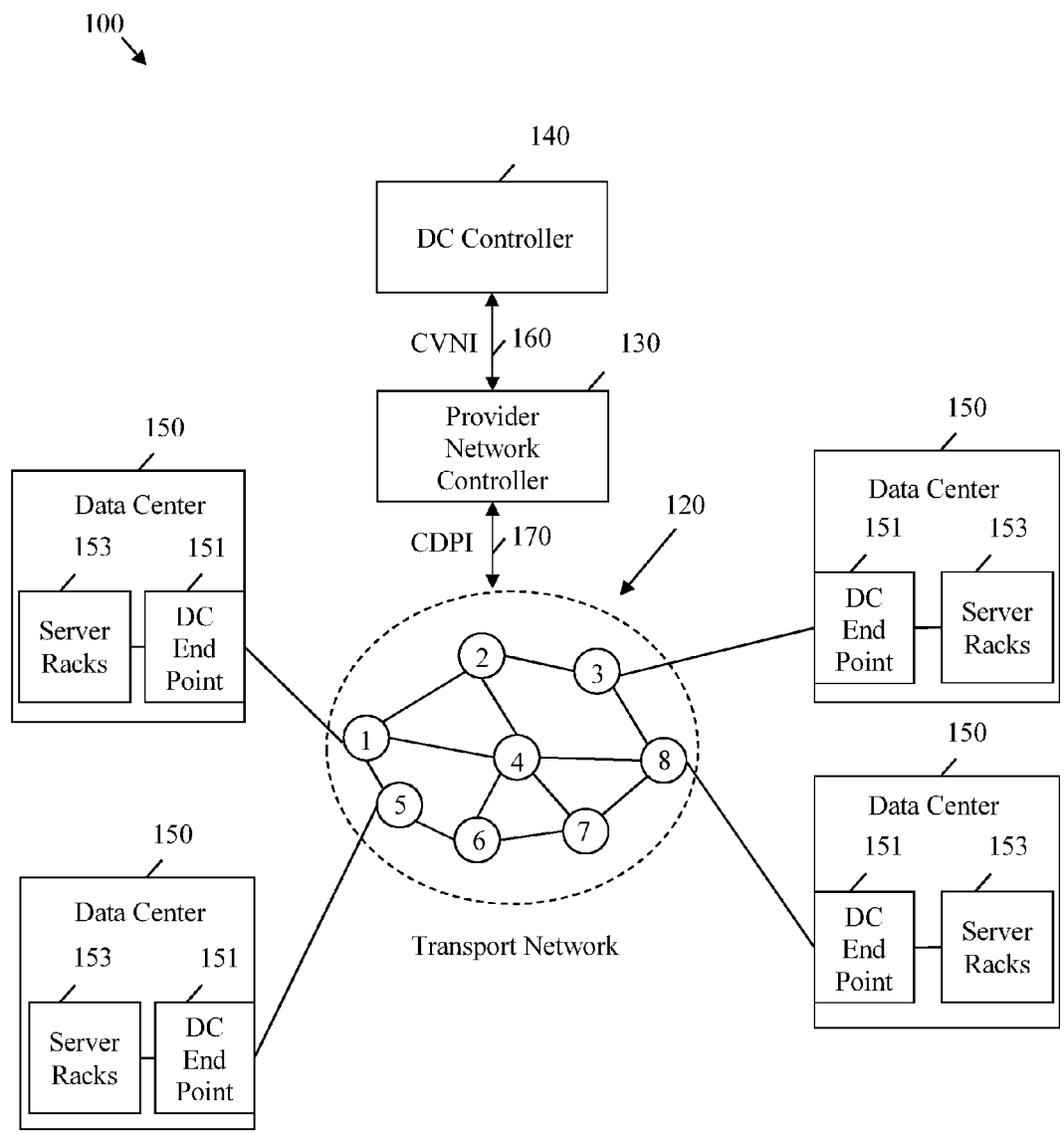
FIG. 1 is a schematic diagram of an embodiment of a DC interconnection network architecture.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The provisioning and operation of new/emerging applications, such as cloud computing, may involve provisioning of processing resources and/or storage space on multiple network components (e.g. servers). Based on the changing needs of a user, resources/data may be migrated between servers, which may be positioned in one or more DCs. Such transfers may be intra-DC transfers, inter-DC transfers, and/or inter-telecommunications provider transfers. The associated networks may be divided into an application stratum and a network stratum. The application stratum may include the applications and/or services implemented and/or operating in the application layer, the presentation layer, and/or the session layer of the OSI model. The network stratum may include processes operating in the transport layer, network layer, data link layer, and/or physical layer of the OSI model. Services operating in the application stratum may be aware of available server resources, but may not be aware of, and may not be configured to interpret data relating to, network topology and/or network resources. For example, an application stratum process may be configured to send a ping message to determine latency between two network nodes at a specific point in time, but may not be able to determine the reason for such latency, how such latency changes over time, and/or what the latency would be when performing a multi-node to multi-node transfer. Likewise, network stratum processes may not have access and/or the ability to interpret application stratum resource data. Further, systems operating in different strata may be owned by different telecommunications providers. As such, complete inter strata sharing may result in unacceptable security concerns in some cases. For these reasons, services operating in either stratum may be unable to select optimal destination server(s) for data/resource migration due to lack of complete information, resulting in a server selection (SS) problem. Because of strict separation between the strata and separation between providers, handling and coordinating service provisioning across both the application stratum and the network stratum may be different from handling traditional services, such as network provisioning of an end-to-end data transfer between a single source and a single destination.

Additionally, DC interconnection may be based on a pre-allocated static Wide Area Network (WAN) optical pipes between DC sites. The pre-allocated capacity between DC sites may be engineered for peak rate and may be underutilized due to fluctuating traffic demands. This mode of operation may not be suited to dynamic allocation of new applications to one out of a number of candidate DC sites, while adjusting the WAN bandwidth accordingly. For example, some workload or data may need to be migrated on the fly from one DC to another. Disaster recovery is another example in which a large amount of data may need to find alternative DCs when the currently serving DC experiences an outage affecting application performance. As such, DC interconnection as discussed above may lack a seamless orchestration between DC control and Provider Network control.

Disclosed herein is a service specific virtual topology base that may be positioned in a network stratum and may generate an abstracted representation of a service specific limited set of network topology data. An application stratum component, for example a DC controller, may initiate a virtual service negotiation with the service specific virtual topology base by transmitting virtual service request that comprises a set of network source addresses, destination addresses, and/or service specific objectives. The virtual service request may be considered a request to route data across a domain associated with the service specific virtual topology base between at least one of the source addresses and at least one of the destination addresses. The service specific objective(s) may indicate a request to optimize the requested route(s) based on the attendant network characteristics. The service specific objective(s) may comprise lowest latency, lowest monetary cost, highest reliability (e.g. disjoint paths), highest bandwidth, etc. The message(s) may be transmitted via a Control Virtual Network Interface (CVNI), which may be a north bound interface between the strata. The service specific virtual topology base may request that a physical network control component perform an associated path computation(s), for example using a k-shortest path algorithm selected based on the service specific objective(s), for example, network link cost for lowest monetary cost, network link delay for lowest latency, shortest pair of paths for highest reliability, etc. The service specific virtual topology base may assemble the links and/or nodes associated with paths computed by the network control component into a service specific topology. The service specific virtual topology base may also reduce/virtualize the service specific topology, for example removing all degree-2 transit nodes. A degree-2 transit node may be a nonterminal network node (e.g. non-source and non-destination) which is traversed by at least one of the computed network paths and is connected to exactly two links which are traversed by the computed network paths which traverse the network node. The links incident to the removed degree-2 transit node may be merged to create a virtual link. The service specific topology may be further reduced/virtualized by removing all degree-1 transmit nodes (e.g. nonterminal network nodes connected to exactly one link traversed by computed path(s)). The resulting service specific virtual topology may be stored in the service specific virtual topology base and/or transmitted to the requested application stratum component. The service specific virtual topology data may comprise a reduced security risk, may be easily transmitted, and may be more easily interpreted by application stratum components than raw network stratum data.

The present disclosure may employ a plurality of terms, some of which may be defined as discussed hereinafter. A provider network may be a wide-area network capable of providing data plane connectivity between geographically distinct sites. A service provider may be an entity responsible for providing WAN services to clients. It may also be the same as network provider when it owns the entire transport network providing the network services. A PNC may be the service provider's network controller, which may be responsible for coordinating actions with the DC controller. A DC operator may be an entity responsible for providing high capacity compute/computing and storage services to clients, for example a client of the service provider. A DC controller may be the DC Operator's controller, which may obtain WAN services from the service provider. A CVNI may be an interface for service advertisement and activation between the DC Controller and PNC.

FIG. 1 is a schematic diagram of an embodiment of a DC interconnection network 100 architecture. Network 100 may comprise a plurality of DCs 150, which may be interconnected by a transport network 120. The DCs 150 may be controlled by a DC controller 140 operating in an application stratum. The transport network 120 may be controlled by a PNC 130, which may operate in the network stratum. The DC controller 140 may initiate a virtual network service negotiation with the PNC 130 via a CVNI 160. The virtual network service negotiation initiation message may comprise source addresses and/or destination addresses representing DC endpoints 151 which may potentially be connected via the transport network 120. The virtual network service negotiation initiation message may further comprise a service specific objective. The PNC 130 may compute path(s) across the transport network 120 that meet the service specific objective, create a service specific topology, virtualize the service specific topology, and return the service specific virtual topology to the DC controller 140. The DC controller 140 may then employ the service specific virtual topology to determine which DC endpoints 151 should be connected. Upon determining the appropriate DC endpoint 151 connections, the DC controller 140 may request associated connection(s) via the PNC 130 and/or directly from the transport network 120 (e.g. via the transmitting DC endpoint 151) to support data migration between DCs 150.

A DC 150 may be a facility configured to store data, execute processes, and/or provide network services for clients, such as end users, application service providers, other networks, etc. A DC 150 may comprise a plurality of server racks 153, which may comprise interconnected servers (e.g. interconnected by a core network). The servers may be components which provide the data storage, process execution, and/or network services. A DC 150 may comprise a network domain and/or a plurality of network sub-domains. NEs in a first domain and/or sub-domain may be segregated from NEs in a second domain and/or subdomain for security and/or organizational purposes. For example, NEs in a single domain/sub-domain may employ a common routing protocol and may be administered by a common management system. Communications may pass between domains at DC endpoints 151, which may provide security, network address translation, protocol translation, and other inter-domain management functions for the DC 150 domain. DC endpoints 151 may comprise, for example, border routers, Network Address Translation (NAT) devices, and/or other devices that support inter-domain communication. DC endpoints 151 may operate in the network stratum and server racks 153 may operate in the network stratum and/or the application stratum.

In some cases, a plurality of DCs 150 may be owned and/or controlled by a single telecommunications operator. By employing cloud computing principles, an operator may dynamically allocate DC 150 resources (e.g. server processor usage, storage space, etc.) in a plurality of DCs 150 to a single client. As such, data may be transmitted between DCs 150 to support network resource load balancing as network resource (e.g. server) utilization changes. In another embodiment, data may be transferred between DCs 150 in the case of equipment failure, security threats, natural disasters, etc. A provider may or may not own/control the transport network 120 that supports connectivity between the DCs 150. A telecommunications operator may employ a DC controller 140, which may be a NE configured to initiate data transfers between the DCs 150. A DC controller 140 may operate in an application stratum and may manage data transfers in response to client requests and/or other application initiated changes. For example, a DC controller 140 may initiate a data transfer when an application wishes to move a virtual machine between DCs 150, when an application indicates latency at a certain DC 150 has become unacceptable for the application's needs, based on a direct client interaction with an application, when an application indicates a need for a backup, etc. A DC controller 140 may or may not operate in the same domain as any of the DCs 150. The DC controller 140 may operate in a different domain from the PNC 130 and the transport network 120.

DCs 150 may be connected by transport network 120. Transport network 120 may comprise a plurality of NEs configured to forward data (e.g. a data forwarding plane). For example, the transport network 120 may comprise a plurality of routers, switches, gateways, etc., which may act as network nodes. The NEs may be connected by electrical, optical, and/or electro-optical connections (e.g. cables, fibers, etc.), which may function as links connecting the nodes. The transport network 120 may operate in the network stratum. For example, the transport network 120 NEs may employ Generalized Multi-Protocol Label Switching (GMPLS), Open Shortest Path First (OSPF), OSPF-Traffic Engineering (OSPF-TE), IP, Media Access Control (MAC), Virtual Local Area Network (VLAN), Virtual Extensible Local Area Network (VXLAN), Openflow, or other routing protocols to forward data across the transport network 120 between the DCs 150. Transport network 120 may comprise one or more domains, and may not share a domain with any of the DCs 150 and/or DC controller 140.

PNC 130 may be configured to manage the transport network 120. PNC 130 may operate in the network stratum and may operate in the same domain as the transport network 120 and a different domain from the DCs 150 and/or or the DC controller 140. The PNC 130 may compute and/or provision paths across transport network 120. PNC 130 may maintain an awareness of transport network 120 resource usage and/or topology. For example, PNC 130 may comprise a Path Computation Element (PCE). PNC 130 may also be configured to abstract such data upon request for use by application stratum components. PNC 130 may be configured to control transport network 120 via a Control Data Plane Interface (CDPI) 170, which may be implemented as a northbound interface or an east-west interface. A northbound interface may be any interface that supports communication between OSI layers and an east-west interface may be any interface that supports communication between components in the same OSI layer. For example CDPI 170 may be implemented in Openflow, GMPLS, PCE Protocol (PCEP), Digital Signal 1 (T–1), etc. PNC 130 may also be configured to communicate with the DC controller 140 via a CVNI 160. CVNI 160 may be considered a northbound interface as CVNI may support communication between the PNC 130 in the network stratum and the DC controller 130 in the application stratum. As CVNI 160 may support communication between strata and between domains, CVNI 160 may be considered an inter-domain northbound interface. CVNI 160 may be implemented in JavaScript Object Notation (JSON) protocol, Application-Layer Traffic Optimization (ALTO) protocol, Hypertext Transfer Protocol (HTTP), etc.

Upon determining that an application may require data to be transmitted between DCs 150, the DC controller 140 may initiate a virtual network service negotiation with the PNC 130 via CVNI 160. The DC controller 140 initiation message may comprise DC endpoints 151 as the network source(s) and/or network destination(s) of the data that is to be transferred via the transport network 120. The DC controller 140 request may further comprise a service specific objective such as lowest latency, lowest monetary cost, highest reliability, highest bandwidth, etc. The PNC 130 may compute a plurality of paths across transport network 120 that meet the service specific objective. For example, the path computation may take the form of a k-shortest path algorithm. Network stratum components may not natively be configured to understand application layer service objectives. As such, PNC 130 may translate the application layer virtual network service initiation message into an equivalent network stratum request by interpreting the service specific objective and selecting an appropriate k-shortest path algorithm. The PNC 130 may create a service specific topology that comprises all links and nodes positioned along any computed path that meets the service specific objective. Such service specific topology may be substantially reduced from the topology of transport network 120 and may represent only topology information relevant to the DC controller's 140 request. PNC 130 may also virtualize the service specific topology by removing all degree-2 transit nodes and attendant links and replacing them with a virtual link. A degree-2 transit node may be a nonterminal network node (e.g. non-source and non-destination) that is traversed by at least one of the computed network paths and is connected to exactly two links that are traversed by the computed network paths that traverse the network node. PNC 130 may also remove all degree-1 transmit nodes (e.g. non-terminal network nodes connected to exactly one link traversed by computed path(s)), which may also be referred to as stub nodes. Virtualization may remove extraneous data from the service specific topology. The resulting service specific virtual topology may be forwarded to the DC controller 140. The service specific virtual topology may comprise sufficient data to allow the DC controller 140 to make informed routing decisions between DCs 150, while providing data in a user friendly manner that is easily usable by application stratum components. The use of a service specific virtual topology may avoid inundating the DC controller 140 with large amounts of topology data that is irrelevant to the virtual network service negotiation initiation message. The use of a service specific virtual topology may also support network security by allowing the PNC 130 to mask sensitive data relating to the architecture of transport network 120 and prevent such sensitive data from being transferred to another potentially rival telecommunications operator. Based on the service specific virtual topology, the DC controller 140 may select appropriate DC endpoints 151 for data transfer, select optimal paths from the reduced topology data, and initiate communications between the DCs 150 along the selected paths. For example, the paths may be provisioned via a cross stratum communication with PNC 130 or requested directly via a DC endpoint 151 request to transport network 120 using an east-west interface.

As discussed above, network 100 may address data a center interconnection (DCI) serving traffic flows between separate DCs. One of the characteristics of this network 100 architecture is that the provider network (e.g. transport network 120) may be shared with other client traffic. Another characteristic of network 100 is the control separation of DC 150 and provider network (e.g. transport network 120). Because of this separation, seamless orchestration may be employed between the DC controller 140 and the PNC 130. Network 100 may be deployed in a plurality of embodiments. In a first embodiment, a network provider's DCs 150 may be interconnected via network provider's transport network 120. The separation of DC 150 and network 120 control may be a consequence of corporate organization or skill sets, but the network controller (e.g. PNC 130) may trust the DC controller 140. In a second embodiment, third party DCs 150 may be interconnected via the network provider's transport network 120. For the first embodiment, the DC controller 140 may act as an internal client to the PNC 130. For the second embodiment, the DC controller 140 may act as an external client to the PNC 130. The second embodiment may require tighter control in terms of policy, security and the degree of information sharing between DC 150 and network 120. Network 100 may depict a high-level network architectural context for these embodiments. The service provider's transport network 120 may support a number of different client applications including DC 150 interconnection.

To support the embodiments discussed herein, several assumptions may be made. The DC controller 140 may be aware of all DC endpoint 151 interfaces that are connected to the provider network 120. Also, a data plane connection between each DC endpoint 151 interface and a corresponding network provider endpoint interface (e.g. a user-network interfaces (UNIs) of transport network 120) may have been established prior to communications between the DC controller 140 and the PNC 130. Dynamic establishment of a data plane connection may be employed in some cases to support dynamic attachment to the provider network (e.g. transport network 120), for example via wireless access technologies. In addition, a service contract may be in force between the DC 150 operator and the service provider that sets the relevant policies regarding the operation of the service(s) available to the DC operator and by extension to the DC controller 140. The PNC 130 may also be aware of the provider network's (e.g. transport network 120) endpoint interfaces that are connected to DCs 150 operated by the DC operator and covered by the service contract. An authentication mechanism that supports dynamic attachment to the provider network (e.g. via wireless access technologies) may be employed in some embodiments. The DC controller 140 may have full visibility of (e.g. access to and/or awareness of) each DC 150 under its control. This visibility may include DC 150 resource information, DC 150 location information, interfaces to transport networks 120 and other user/application related information.

For the DC 150 interconnection application, the client controller may be the DC controller 140, which may be an internal entity or an external entity with respect to the relationship with the service provider. In some embodiments, each DC 150 may have a local DC controller 140, and these DC controllers 140 may form a confederacy or hierarchy to interface the PNC 130. For purposes of this disclosure, a single logical DC controller 140 may be assumed to connect to a single logical PNC 130. The DC controller 140 may be a client to the PNC 130. The DC controller 140 may be a software agent operating on behalf of the DC operator and may be responsible for coordinating WAN resources to meet the requirements of the applications hosted in the DCs 150.

The PNC 130 may be a software agent operating on behalf of the service provider. The PNC 130 may be responsible for advertising to clients (e.g. the DC controller 140) available connectivity services and instantiating services requested by those clients. The present disclosure may provide benefits for both DC providers and service providers, such as improving optical transport network control and management flexibility (e.g. ability to deploy third party client management/control systems) and the development of service offerings by network virtualization. The CVNI 160 may enable programmatic and virtual control of optical transport networks (e.g. transport network 120) by allowing applications to have greater visibility of and control over connections carrying their data, and the monitoring and protection of these connections, subject to operator policy.

Figure 2:
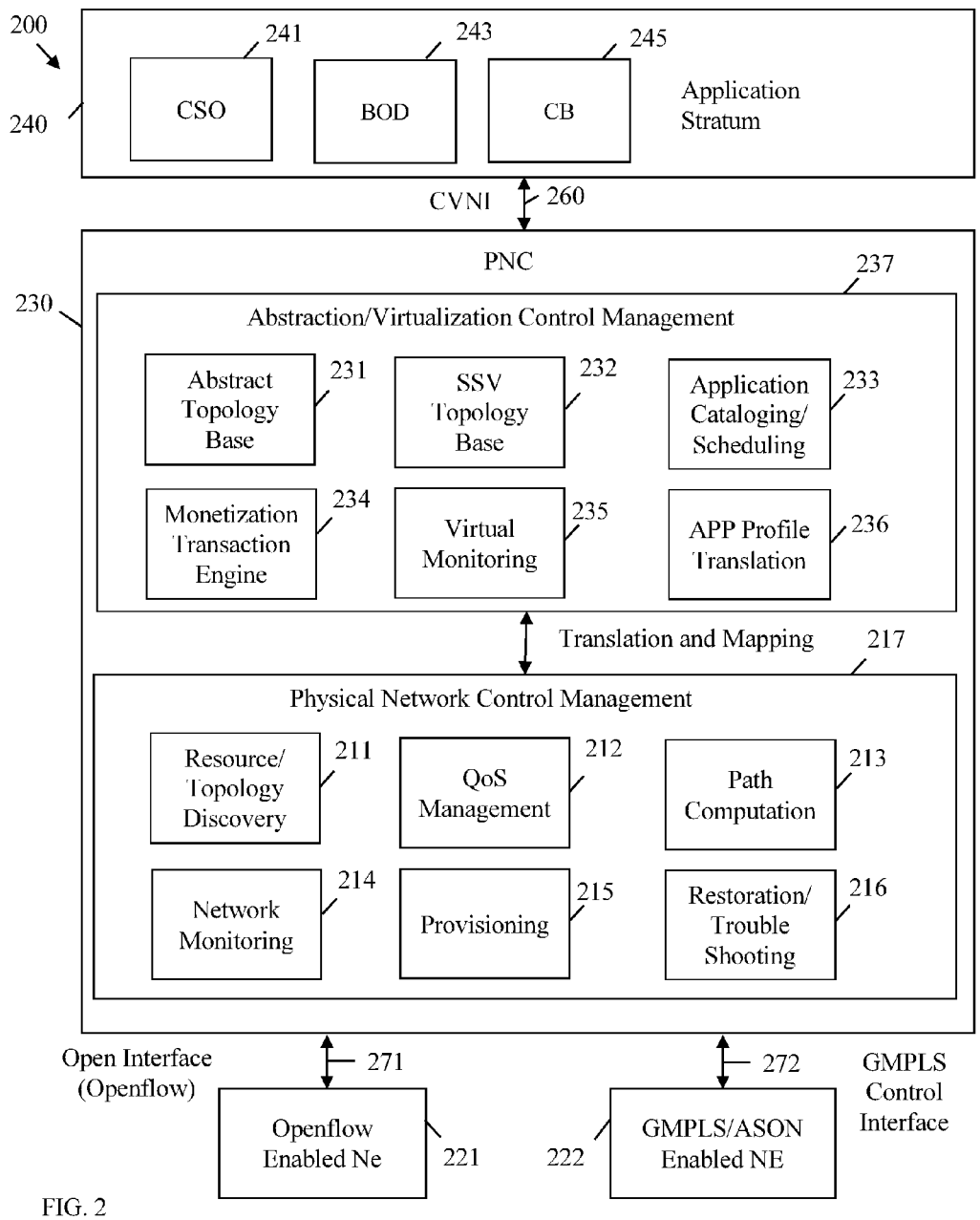
FIG. 2 is a schematic diagram of another embodiment of a DC interconnection network architecture.

FIG. 2 is a schematic diagram of another embodiment of a DC interconnection network 200 architecture. Network 200 may comprise an application stratum component 240 and a PNC 230, which may be substantially similar to DC controller 140 and PNC 130, respectively. Network 200 may also comprise a plurality of openflow enabled NEs 221, a plurality of GMPLS/Automatically Switched Optical Network (ASON) enabled NEs 222, or combinations thereof. NEs 221 and/or 222 may act as nodes and/or links in a transport network such as transport network 120 and may be employed to perform routing and other data plane functions, such as accepting path reservations and/or forwarding data between DCs (e.g. DC between endpoints 151). The PNC 230 may virtualize topology of NEs 221 and/or 222, which may operate in a software defined network (SDN) and make such virtualized topology available to the application stratum component 240.

Application stratum component 240 may comprise a plurality of components and/or functions which may manage service specific network tasks related to application resources and/or services. The application stratum may comprise a Cross Stratum Optimization (CSO) 241 component, a Bandwidth on Demand (BoD) 243 component, and a Cloud Bursting (CB) 245 component. CSO 241, BoD 243, and CB 245 may each perform application service related tasks and may be implemented in software, firmware, and/or hardware. CSO 241 may be configured to determine and/or manage optimized resource provisioning (e.g. across a transport network such as transport network 120) as requested by an associated application by utilizing data provided by both the application stratum and the network stratum. BoD 243 may be configured to manage bandwidth capacity (e.g. across a transport network) for various applications and dynamically modify bandwidth allocations for such applications to account for communication bursts. CB 245 may be configured implement network cloud bursting. Cloud bursting may be an application deployment model in which an application operates in a private cloud (e.g. in a single DC such as a DC 150) during periods of normal demand and operates in a public cloud (e.g. a plurality of DCs, for example that may be owned by a plurality of operators) during periods of increased demand (e.g. demand spikes.) As such, CB 245 may be configured to obtain addition resources on demand to support cloud based application. Application stratum component 240 may comprise additional components as needed to provision communication paths across a transport network based on application needs in order support inter-DC computing.

PNC 230 may comprise a physical network control and management 217 layer and an abstraction/virtualization control and management 237 layer. The physical network control and management 217 layer may comprise a plurality of components and/or functions which may directly manage NEs operating as network nodes (e.g. in a transport network), such as NEs 221 and/or 222. The physical network control and management 217 layer may comprise a network resource/topology discovery 211 component, a quality of service (QoS) management 212 component, a path computation 213 component, a network monitoring 214 component, a provisioning 215 component, and a restoration/troubleshooting 216 component. Such components and/or functions may be implemented in hardware, software, or firmware. Network resource/topology discovery 211 component may be configured to determine and/or store the manner in which transport network nodes are connected (e.g. topology) and determine and/or store the transmission and/or computational capabilities (e.g. resources) of network links and/or nodes. Such resources may comprise total resources and/or resources available at a specified time. For example, the resource/topology discovery 211 component may comprise a Traffic Engineering Database (TED). QoS management 212 component may be configured to determine and/or allocate transport network resources to ensure minimum resources are available (e.g. bandwidth) for a specified task at a specified time. Path computation 213 component may be configured to compute optimized data path(s) across the transport network, for example via the resource and/or topology data gathered and/or stored by resource/topology discovery 211 component. For example, the path computation 213 component may comprise a PCE, an IP routing management device, a GMPLS routing management device, an Ethernet Management Information Base (MIB), etc. Network monitoring 214 component may be configured to monitor the health of the transport network and related components and alert a network administrator of network faults, slowdowns, or other problematic behavior. Provisioning 215 component may be configured to allocate resources of transport network nodes for specific tasks and inform the affected nodes of the allocation. Restoration/trouble shooting 216 component may be configured to determine the nature of network problems (e.g. trouble shooting), and/or attempt to repair and/or bypass the affected components.

The abstraction/virtualization control and management 237 layer may comprise a plurality of components configured to abstract and/or generalize data from the physical network control and management 217 layer for use by application stratum. The abstraction/virtualization control and management 237 layer may communicate with the physical network control and management 217 layer and translate and/or map physical network data (e.g. related to the transport network) into an abstract form. The abstraction/virtualization control and management 237 layer may comprise an abstract topology base 231, a service specific virtual topology base 232, an application cataloging/scheduling 233 component, a monetization transaction engine 234, a virtual monitoring 235 component, and an application (APP) profile translation 236 component. Such components and/or functions may be implemented in hardware, software, or firmware. The abstract topology base 231 may be configured to generate and/or store an abstracted version of the network topology, which may be received from the network resource/topology discovery 211 component. For example, the abstract topology base 231 may mask network topology and/or network resource data by removing network nodes and/or links and replacing them with virtual nodes and/or links, mask node and/or link identifiers, and/or employ other abstraction techniques. A service specific virtual (SSV) topology base 232 may be configured to request a path computation from path computation component 213 based on a service specific objective, create a service specific topology, virtualize the service specific topology, and store and/or send the service specific virtual topology to the application stratum component 240. The application cataloging/scheduling 233 component may be configured to track applications wishing to employ network resources and order such use of resources over time. The monetization transaction engine 234 may determine, store, allocate, and/or communicate monetary costs incurred by the use of transport network resources, and/or report same to operator(s) of the transport network and/or operator(s) of the application stratum component network (e.g. DC 150 operator). The virtual monitoring 235 component may monitor the health of virtual machines operating in the transport network and repair, bypass, and/or alert a network administrator in case of associated problems. The application profile translation 236 component may be configured to translate application profiles received from the application stratum for use by the network stratum.

Openflow NE 221 may comprise one or more NEs configured to perform electrical based data forwarding and/or routing functions in a transport network by employing an Openflow protocol. Each Openflow NE 221 may comprise a flow table and may route packets according to the flow table. The flow tables may be populated with flow data by the physical network control and management 217 layer components, which may allow the physical network control and management 217 layer to control the behavior of the Openflow NEs 221. GMPLS/ASON enabled NEs 222 may comprise one or more NEs configured to perform optical based data forwarding and/or routing functions in a transport network by employing a GMPLS protocol and/or an ASON protocol. Each GMPLS/ASON enabled NE 222 may comprise a routing table that may be populated with labels (e.g. wavelengths) and may forward, switch, convert, and/or regenerate optical signals based on the routing table data. The routing table may be populated with data by the physical network control and management 217 layer components, which may allow the physical network control and management 217 layer to control the behavior of the GMPLS/ASON enabled NEs 222. It should be noted that NEs 221 and 222 are included as exemplary types data plane NEs. Many other optical, electrical, and/or optical/electrical NEs may be employed within the scope of the present disclosure. Also, a transport network may or may not employ both NEs 221 and 222. If both NEs 221 and 222 are employed in a single transport network, such NEs may be arranged in separate domains to support the use of different control and/or routing protocols.

The PNC 230 may be coupled to the application stratum component 240 via a CVNI 260, which may be substantially similar to CVNI 160. The PNC 230 may be coupled to Openflow NE 221 via an Openflow enabled Open Interface 271 and coupled to GMPLS/ASON enabled NE 222 via a GMPLS control interface 272, respectively. By employing interfaces 160, 271 and 272, PNC 230 may communicate with both the application stratum and the network stratum. For example, PNC 230 may receive a virtual network service negotiation initiation message from the application stratum component 240 (e.g. from CSO 241, BoD 243, and/or CB 245) via CVNI 160. The request may be routed to the service specific virtual topology base 232. The service specific virtual topology base 232 may obtain source addresses, destination addresses, and service specific objective(s) from the virtual network service negotiation initiation message and may request an associated path computation from the path computation 213 component. The path computation 213 component may compute k-shortest paths across NEs 221 and/or 222 based on information from other physical network control and management 217 layer components (e.g. resource/topology discovery 211 component, QoS management 212 component, provisioning 215 component, etc.) Such information may be obtained (e.g. by resource/topology discovery 211 component) from NEs 221 and/or 222 via interfaces 271 and/or 272, respectively. The path computation 213 component may return the computed k-shortest paths to service specific virtual topology base 232, which may create a service specific topology from the computed paths and may virtualize such topology. The service specific virtual topology base 232 may store the service specific virtual topology for later use and/or may forward the service specific virtual topology to the application stratum component 240 over CVNI 260 as part of a virtual network service negotiation response. The application stratum component 240 may employ the service specific virtual topology to make routing decisions based on the abstracted/virtualized data. The application stratum component 240 may then provision any needed network paths via CVNI 260, service specific virtual topology base 232, abstract topology base 231, provisioning 215 component, Open interface 271 and/or GMPLS control interface 272.

Figure 3:
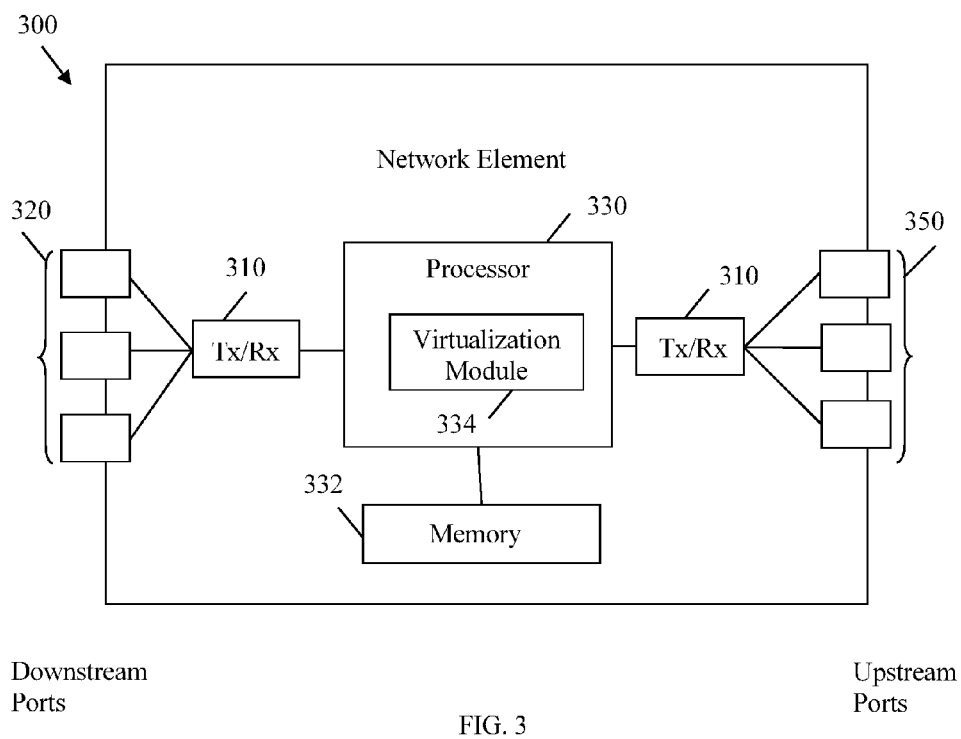
FIG. 3 is a schematic diagram of an embodiment of a NE, which may act as a node within a DC interconnection network architecture.

FIG. 3 is a schematic diagram of an embodiment of a NE 300 which may act as a node within a DC interconnection network architecture, such as a PNC 130 and/or 230. NE 300 may be configured to receive virtual network service negotiation initiation messages, compute service specific virtual topologies, and transmit virtual network service negotiation responses to the application stratum. NE 300 may be implemented in a single node or the functionality of NE 300 may be implemented in a plurality of nodes. In some embodiments NE 300 may also act as other node(s) in network 100 and/or 200, such as DC controller 140, application stratum component 240, a server in server racks 153, a NE in transport network 120, NE 221, and/or NE 222. One skilled in the art will recognize that the term NE encompasses a broad range of devices of which NE 300 is merely an example. NE 300 is included for purposes of clarity of discussion, but is in no way meant to limit the application of the present disclosure to a particular NE embodiment or class of NE embodiments. At least some of the features/methods described in the disclosure may be implemented in a network apparatus or component such as a NE 300. For instance, the features/methods in the disclosure may be implemented using hardware, firmware, and/or software installed to run on hardware. The NE 300 may be any device that transports frames through a network, e.g. a switch, router, bridge, server, a client, etc. As shown in FIG. 3, the NE 300 may comprise transceivers (Tx/Rx) 310, which may be transmitters, receivers, or combinations thereof. A Tx/Rx 310 may be coupled to plurality of downstream ports 320 (e.g. southbound interfaces) for transmitting and/or receiving frames from other nodes and a Tx/Rx 310 coupled to plurality of upstream ports 350 (e.g. northbound interfaces) for transmitting and/or receiving frames from other nodes, respectively. NE 300 may comprise additional TX/Rxs 310 and/or ports as needed for a particular embodiment, for example to support east-west interfaces. A processor 330 may be coupled to the Tx/Rxs 310 to process the frames and/or determine which nodes to send frames to. The processor 330 may comprise one or more multi-core processors and/or memory devices 332, which may function as data stores, buffers, etc. Processor 330 may be implemented as a general processor or may be part of one or more application specific integrated circuits (ASICs) and/or digital signal processors (DSPs). Processor 330 may comprise a virtualization module 334, which may implement the functionality of service specific virtual topology base 232. In an alternative embodiment, the virtualization module 334 may be implemented as instructions stored in memory 332, which may be executed by processor 330. In another alternative embodiment, the virtualization module 334 may be implemented on separate NEs. The downstream ports 320 and/or upstream ports 350 may contain electrical and/or optical transmitting and/or receiving components.

It is understood that by programming and/or loading executable instructions onto the NE 300, at least one of the processor 330, virtualization module 334, downstream ports 320, Tx/Rxs 310, memory 332, and/or upstream ports 350 are changed, transforming the NE 300 in part into a particular machine or apparatus, e.g. a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 4:
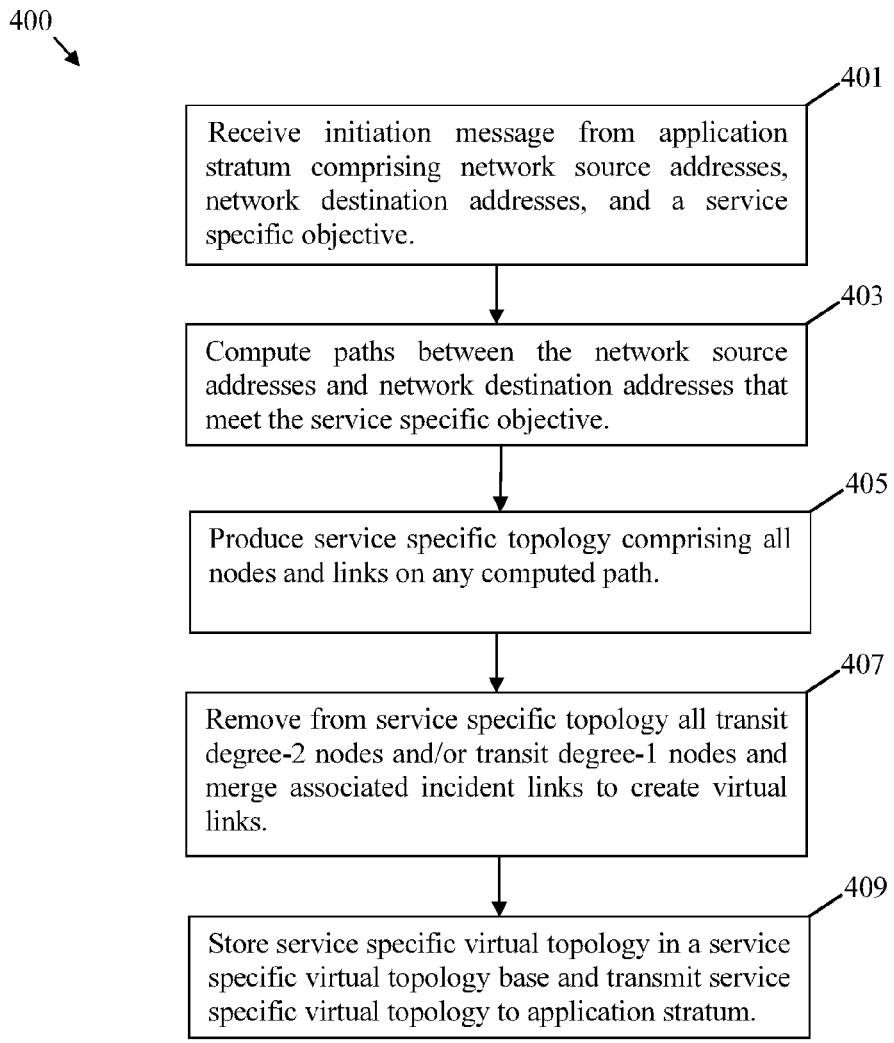
FIG. 4 is a flow chart of an embodiment of a method of generating a service specific virtual topology.

FIG. 4 is a flow chart of an embodiment of a method 400 of generating a service specific virtual topology. For example, method 400 may be implemented in a PNC 130 and/or 230. At block 401, a virtual network service negotiation initiation message may be received from an application stratum component (e.g. a DC controller 140 and/or application stratum component 240). The initiation message may comprise at least one network source address, at least one network destination address, and a service specific objective. The network source address(es) and network destination address(es) may comprise the addresses of DC endpoints, such as DC endpoints 151, associated with potential source and destination DCs associated with a potential data migration.

At block 403, a plurality of paths between the network source address(es) and the network destination addresses may be computed that meet the service specific objective. For example, a service specific virtual topology base (e.g. service specific virtual topology base 232) may request a path computation component (e.g. path computation component 213) perform a k-shortest path computation. The service specific virtual topology base may determine which k-shortest path algorithm to employ based on the service specific objective. For example, a k-shortest paths algorithm based on network link delay may be employed when the service specific objective comprises lowest latency, a k-shortest paths algorithm based on network link cost may be employed when the service specific objective comprises lowest monetary cost, and/or k-shortest pair of paths algorithm may be employed when the service specific objective comprises highest reliability. A service specific virtual topology base may be required to map the service specific objective to an associated k-shortest path algorithm as a path computation component may not be natively configured to interpret a service specific objective (e.g. as a service specific objective may be general in nature and may not be concrete enough to be natively supported by network stratum components).

At block 405, a service specific topology may be produced that comprises all nodes and links on any path computed at block 403. The service specific topology may be significantly reduced from a full network topology. As such, the service specific topology may comprise much less data and may be more easily employed by the application stratum.

At block 407, the service specific topology of block 405 may be virtualized by removing each transit degree-2 nodes and merging each transit degree-2 node's incident links to create a virtual link. The service specific topology may be further virtualized by removing all transit degree-1 nodes. The virtual link may comprise a routing cost and latency that is the sum of the costs and latency, respectively, of both links and the transit degree-2 node for the purposes of path computation. The virtual link may comprise a capacity (e.g. bandwidth) equal to the minimum capacity of the replaced links and/or node. Transit degree-1 and degree-2 nodes may be necessary from a routing and/or forwarding point of view and may accordingly be included in the computed paths. However, transit degree-1 and degree-2 nodes may be removed without negatively impacting the topology data from a pathing standpoint as transit degree-1 and degree-2 nodes may not have two entry links or two exit links and may not act as a decision point for determining a path. As such, transit degree-1 and degree-2 nodes may be necessary from a network stratum point of view, but may be irrelevant and/or burdensome from an application stratum point of view.

At block 409, the service specific virtual topology of block 407 may be stored in a service specific virtual topology base for later use (e.g. in response to additional virtual network service negotiation initiation messages). The service specific virtual topology may also be transmitted to application stratum the application stratum component of block 401 in a virtual network service negotiation response message. The service specific virtual topology may then be used by the application stratum (e.g. DC controller) for path/resource provisioning, scheduling, connection initiation, and/or other actions related to the transfer of the data between the source address(es) and the destination address(es) (e.g. between the DCs).

As discussed above, the present disclosure may support pre-network connection information exchange and associated workflow. For example, method 400 may negotiate between a DC controller and a PNC. The actor that initiates negotiation may be the DC controller. As a client to the transport network, the DC controller may be interested in knowing relevant transport network resource information, for example, in light of DC interconnection. Transport network resource information may be expressed via a VNT.

Initially, the DC controller may negotiate with the PNC to identify a set of endpoints (e.g. DC endpoints 151) the DC controller wishes to connect. As part of the negotiation, the DC controller may also express traffic characteristics that may be supported between endpoints by the VNT such as traffic demand (e.g. bandwidth), QoS requirements, and willingness to pay associated with DC endpoint interface pairs (e.g. as a service specific objective). In response, the PNC may provide a best available VNT or a list of multiple VNT connectivity options. The DC controller may negotiate multiple independent VNTs for different applications. Calendaring (e.g. supporting network connection at some future time) may also be supported.

The VNT may be described as a set of nodes and links. The VNT external interfaces may correspond to physical ports, each representing a client user-network interface (UNI), which may act as a data plane connection between a client DC endpoint and provider network (e.g. transport network 120) endpoint. The internal interfaces (e.g. of the provider network) may be virtual and may or may not correspond to physical ports. To allow negotiation to take place, the correspondence between DC endpoint interface identifiers and provider network endpoint interface identifiers may be established. This may be accomplished using a manual process, for example by exchanging identifiers between DC operations and provider network operations personnel, and/or may be automated, for example by using a Link Layer Discovery Protocol (LLDP) to exchange endpoint identifiers at the UNIs. If the endpoint interfaces are under SDN control (e.g. OpenFlow) the exchange can be done using Openflow protocol PACKET_OUT and PACKET_IN messages. By this exchange both the DC controller and the PNC can acquire the association between the DC endpoint identifiers (DC EPIDs) and the provider network endpoint identifiers (PN EPIDs).

During virtual network service negotiation with the DC controller, the PNC may be the actor for creating a response to the DC controller with an associated VNT. If the DC endpoints are identified in the CVNI using the DC EPID, the PNC may translate each of these DC EPIDs to associated PN EPIDs before proceeding to process the request. If the endpoints are identified by the DC controller using the ID pair (DC EPID, PN EPID), the PNC may not access a translation service and may process the request using its own identifier from each ID pair. The PNC may provide a VNT in response to the DC controller. In order to provide a relevant VNT, the PNC may a request to a path computation entity of the PNC and may determine the feasibility of the request. The corresponding result may be sent by the PNC to the DC controller. The translation of the computed physical network paths to virtual network topology may be done based on the pre-negotiated policy and contract. For instance, the degree of detail for the VNT with respect to the computed physical network paths may be subject to the contract. The PNC may also be responsible for notifying the client (e.g. the DC controller) about topology changes, for example as the result of network additions.

Several objects and associated parameters may be supported as part of a virtual network service negotiation initiation and/or response. A connectivity object may be employed to express VNT connection related information, such as: (i) point-point; (ii) point-multipoint; (iii) multi-destination (e.g. anycast); (iv) shared pool; and/or (v) other connectivity types. For each connectivity type, the directionality may be expressed as: (i) uni-directional; and/or (ii) bi-directional. A location information object may be employed to describe the DC endpoint interfaces associated with the connectivity object. For uni-directional connectivity, the source list and the destination list may be distinguished (e.g. in the information object). A QoS object may describe QoS traffic demand (e.g. bandwidth) and/or other QoS information associated with DC endpoint interface pairs (e.g. latency).

A VNT, as discussed above, may be a client view of the transport network. The VNT may be the view that the network operator provides to the client (e.g. DC controller). The VNT may only show the relevant client endpoints (e.g. DC endpoints) and some level of network connectivity (which may depend on a granularity level negotiated between a client and the network), while hiding and condensing the real physical network topology. For example, a VNT may represent portions of a transport network (e.g. sub-networks) as virtual nodes, where each virtual node comprises the same input(s) and output(s) as the replaced subnetwork. Granularity as discussed herein may refer to the amount of topology data transmitted to the client (e.g. DC controller). For example, a low/coarse granularity view may condense a plurality of sub-networks into a single virtual node, a moderate granularity view may condense each sub-network into a separate virtual node, and a high/fine granularity view may show substantially all topology information with virtualization based on relevance to a request.

Figure 5:
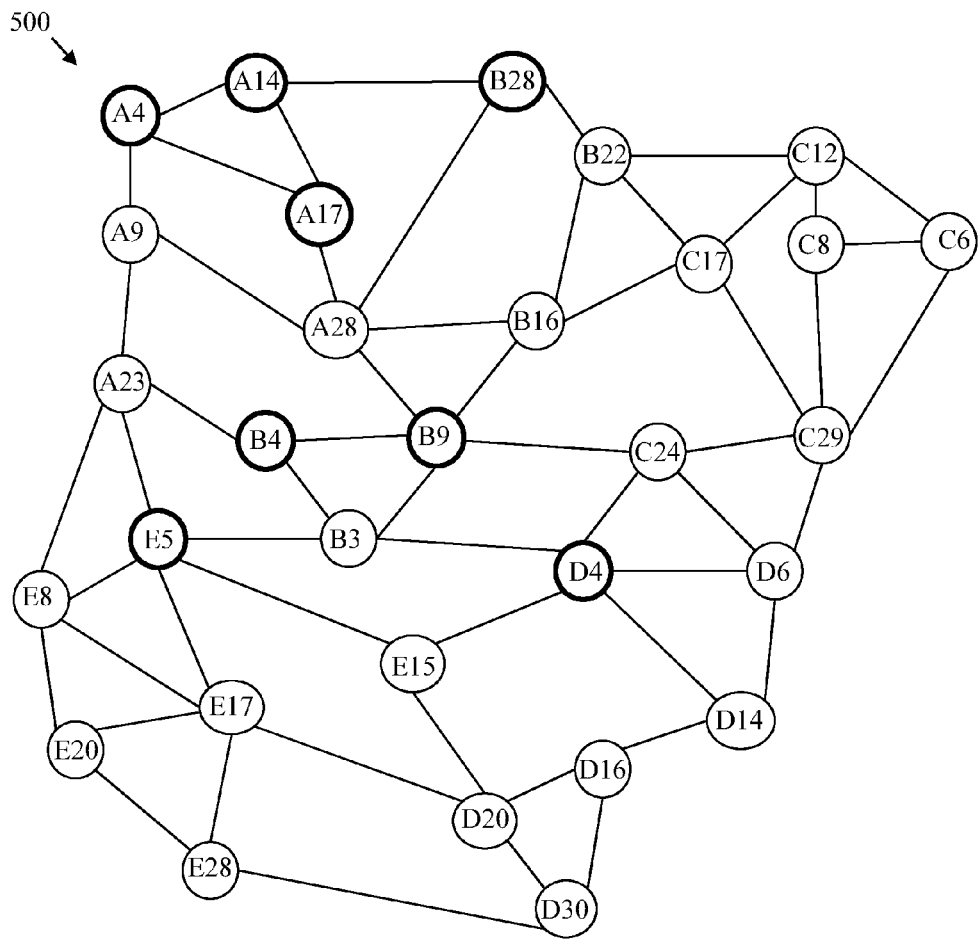
FIG. 5 is a schematic diagram of an example network stratum network topology.

FIG. 5 is a schematic diagram of an example network stratum network 500 topology. Network 500 may be employed as a transport network such as transport network 120. Network 500 is disclosed purely as an example to support discussion of service specific virtual topology creation. Network 500 may comprise nodes A4, A9, A14, A17, A23, A28, B3, B4, B9, B16, B22, B28, C6, C8, C12, C17, C24, C29, D4, D6, D14, D16, D20, D30, E5, E8, E15, E17, E20, and E28. Such node may represent NEs, such as electrical and/or optical switches, routers, gateways, etc., positioned in a single and/or a plurality of domains. Such nodes may be connected via links as shown in FIG. 5. In an embodiment, a PNC, such as PNC 130, 230, and/or other NE implementing method 400, may receive a virtual network service negotiation initiation message indicating a limited set of potential communicating entities in the form of source address and destination address pairs (A4, B9), (A14, B4), (B28, E5), and (A17, D4). For the purposes of generating a service specific virtual topology, such nodes may each be considered to be terminal and/or non-transit nodes. Each terminal/non-transit node is illustrated in bold typeface to promote clarity of understanding.

Figure 6A:
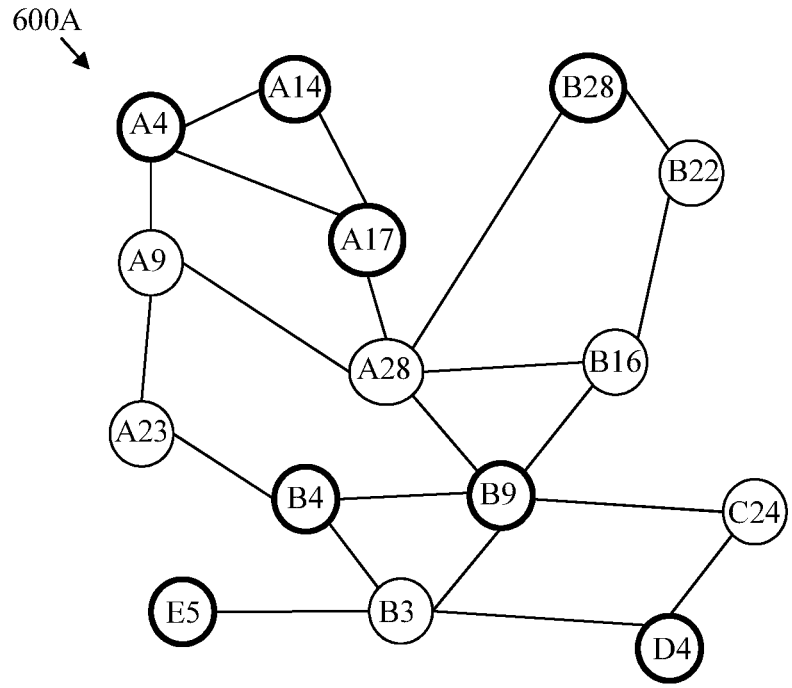
FIG. 6A is a schematic diagram of an example service specific topology for a lowest latency service specific objective.

FIG. 6A is a schematic diagram of an example service specific topology 600A for a lowest latency service specific objective, which may be based on network 500 topology. For example, a virtual network service negotiation initiation message may indicate a service specific objective of lowest latency between source address and destination address pairs (A4, B9), (A14, B4), (B28, E5), and (A17, D4). A service specific virtual topology base may request a path computation between the terminal nodes of network 500 using a k-shortest path based on network link delay. As an example, value of k may be set to four (e.g. by the application stratum component or by the network stratum component). It should be noted that a value of four is purely an example and many other value may be employed. The specific virtual topology base may receive an associated path computation disclosing the four paths with lowest link delay between the terminal pairs and create a service specific topology by collecting all links and nodes along any computed path, which may result in service specific topology 600A.

Figure 6B:
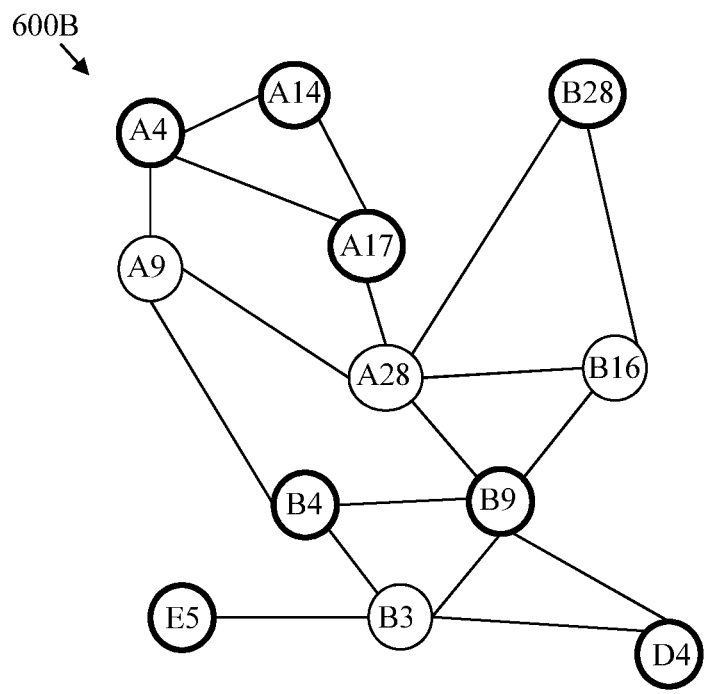
FIG. 6B is a schematic diagram of an example service specific virtual topology for a lowest latency service specific objective.

FIG. 6B is a schematic diagram of an example service specific virtual topology 600B for a lowest latency service specific objective, which may be based on service specific topology 600A. As discussed above, the service specific virtual topology base may virtualize topology 600A by removing all transit degree-2 nodes. Nodes A23, B22, and C24 may each be transit nodes and may have exactly two incident links on network 600A. As such, nodes A23, B22, and C24 may not be pathing decision points. Such nodes and their incident links may each be replaced with a single virtual link resulting in service specific virtual topology 600B.

Figure 7A:
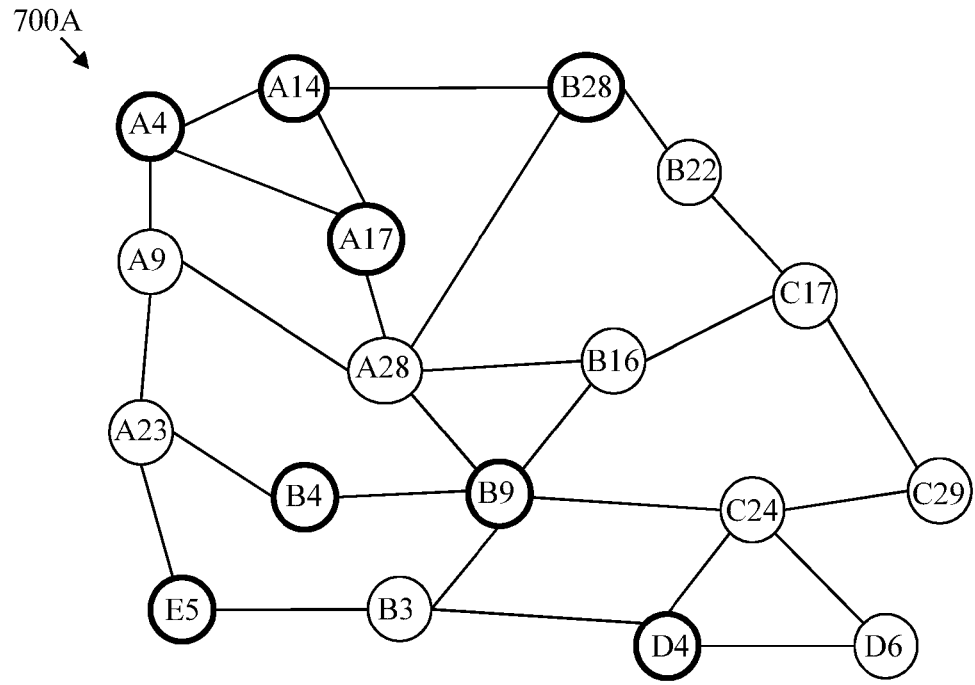
FIG. 7A is a schematic diagram of an example service specific topology for a lowest monetary cost service specific objective.

FIG. 7A is a schematic diagram of an example service specific topology 700A for a lowest monetary cost service specific objective, which may be based on network 500 topology. For example, a virtual network service negotiation initiation message may indicate a service specific objective of lowest monetary cost between source address and destination address pairs (A4, B9), (A14, B4), (B28, E5), and (A17, D4). The PNC may request a k-shortest path computation based on network link network link cost (e.g. per length and/or aggregate cost for all links in the computed path). Topology 700A may result from aggregating all nodes and links along such computed paths.

Figure 7B:
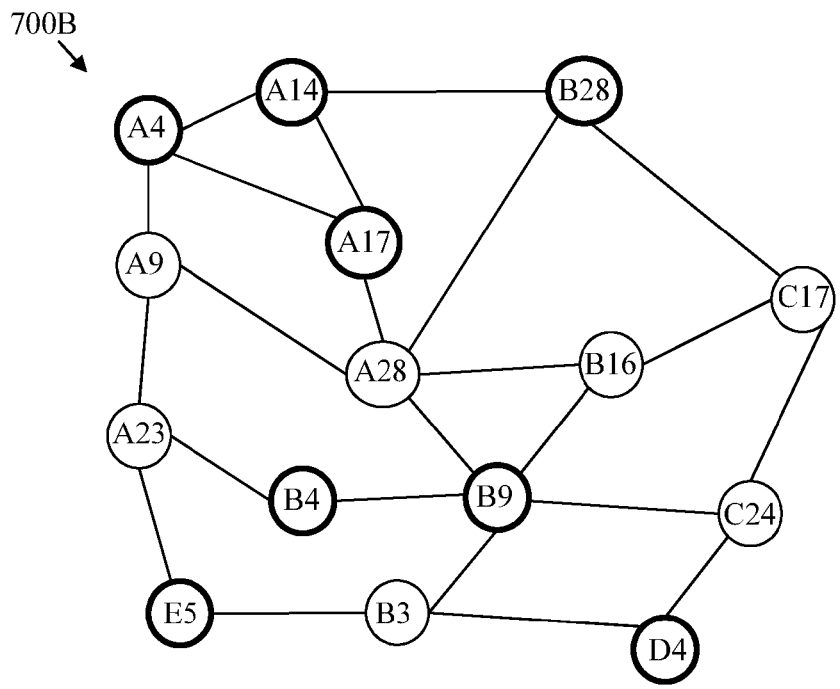
FIG. 7B is a schematic diagram of an example service specific virtual topology for a lowest monetary cost service specific objective.

FIG. 7B is a schematic diagram of an example service specific virtual topology 700B for a lowest monetary cost service specific objective, which may be based on service specific topology 700A. As discussed above, the service specific virtual topology base may virtualize topology 700A by removing all transit degree-2 nodes. Nodes B22, C29, and D6 may each be transit nodes and may have exactly two incident links in network 700A. As such, nodes B22, C29, and D6 may not be pathing decision points. Such nodes and their incident links may each be replaced with a single virtual link resulting in service specific virtual topology 700B.

Figure 8A:
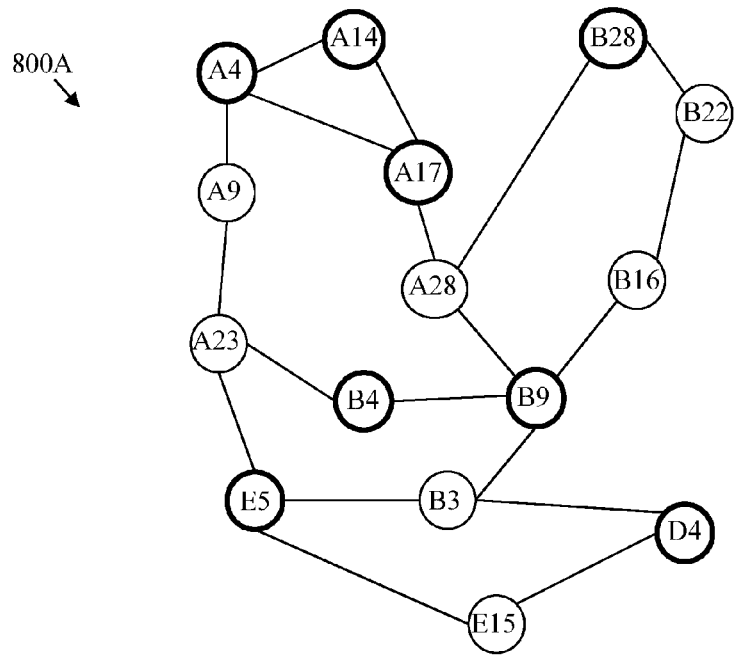
FIG. 8A is a schematic diagram of an example service specific topology for a highest reliability service specific objective.

FIG. 8A is a schematic diagram of an example service specific topology 800A for a highest reliability service specific objective, which may be based on network 500 topology. For example, a virtual network service negotiation initiation message may indicate a service specific objective of highest reliability between source address and destination address pairs (A4, B9), (A14, B4), (B28, E5), and (A17, D4). The PNC may request a k-shortest disjoint pair of paths computation (e.g. where k equals two), where shortest paths may be judged my total routing costs. As an example, the path computation may result in the following paths and associated routing costs:

| Node List | Cost | Capacity |
| --- | --- | --- |
| A4, A17, A28, B9 | 442 | 16 |
| A4, A9, A23, B4, B9 | 541 | 28 |
| A14, A17, A28, B9, B4 | 541 | 15 |
| A14, A4, A9, A23, B4 | 577 | 17 |
| B28, A28, B9, B3, E5 | 424 | 23 |
| B28, B22, B16, B9, B4, A23, E5 | 674 | 21 |
| A17, A28, B9, B3, D4 | 493 | 15 |
| A17, A4, A9, A23, E5, E15, D4 | 897 | 16 |
| A4, A17, A28, B9 | 442 | 16 |
| A4, A9, A23, B4, B9 | 541 | 28 |
| A14, A17, A28, B9, B4, | 541 | 15 |
| A14, A4, A9, A23, B4 | 577 | 17 |
| B28, A28, B9, B3, E5 | 424 | 23 |
| B28, B22, B16, B9, B4, A23, E5 | 674 | 21 |
| A17, A28, B9, B3, D4 | 493 | 15 |
| A17, A4, A9, A23, E5, E15, D4 | 897 | 16 |

As shown above, a pair of disjoint paths (e.g. two paths with no common transit links/nodes) are computed between each source node and each destination node. Disjoint paths may be reliable as any node or link failure along one path may be circumvented by employing the other path. Topology 800A may result from aggregating all nodes and links along such computed paths as listed above.

Figure 8B:
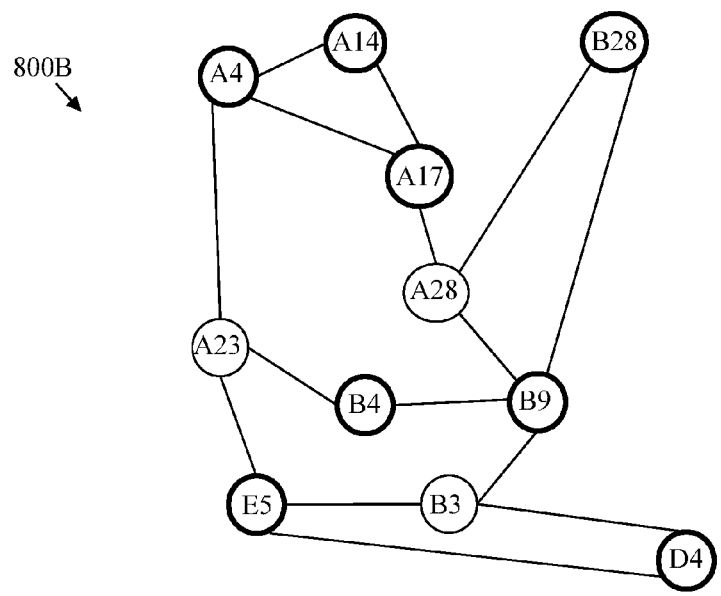
FIG. 8B is a schematic diagram of an example service specific virtual topology for a highest reliability service specific objective.

FIG. 8B is a schematic diagram of an example service specific virtual topology 800B for a highest reliability service specific objective, which may be based on service specific topology 800A. As discussed above, the service specific virtual topology base may virtualize topology 800A by removing all transit degree-2 nodes. Nodes A9, B16, B22, and E15 may each be transit nodes and may have exactly two incident links in network 800A. As such, nodes A9, B22, B16, and E15 may not be pathing decision points. Such nodes and their incident links may each be replaced with a single virtual link resulting in service specific virtual topology 800B.

Figure 9A:
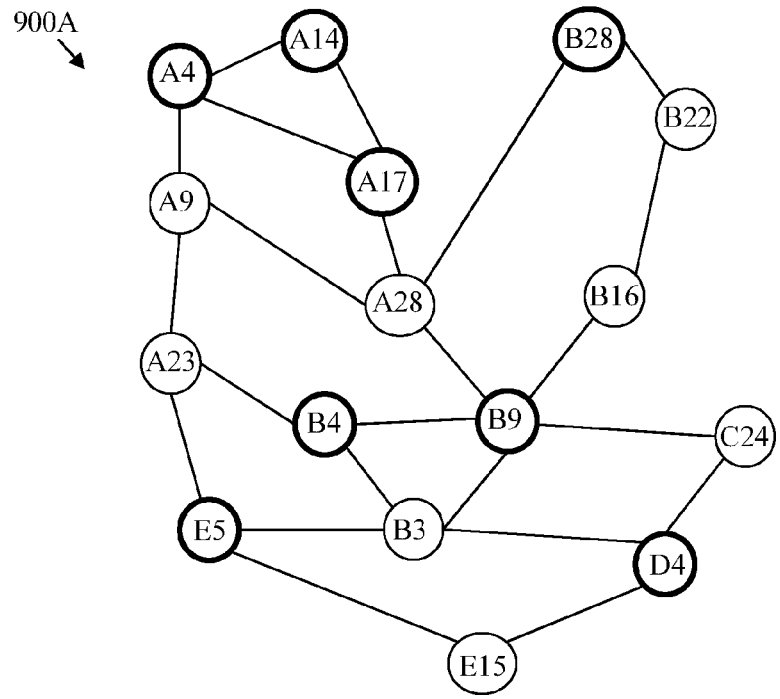
FIG. 9A is a schematic diagram of another example service specific topology for a highest reliability service specific objective.

FIG. 9A is a schematic diagram of another example service specific topology 900A for a highest reliability service specific objective, which may be based on network 500 topology. For example, a PNC may receive substantially the same request as in network 800A, but may employ a different k-shortest disjoint pair of paths computation algorithm, which may result in the following paths and associated routing costs:

| Node List | Cost | Capacity |
| --- | --- | --- |
| A4, A17, A28, B9 | 442 | 16 |
| A4, A9, A23, B4, B9 | 541 | 28 |
| A4, A17, A28, B9 | 442 | 16 |
| A4, A9, A23, B4, B3, B9 | 583 | 28 |
| A14, A17, A28, B9, B4 | 541 | 15 |
| A14, A4, A9, A23, B4 | 577 | 17 |
| A14, A17, A28, B9, B4 | 541 | 15 |
| A14, A4, A9, A23, E5, B3, B4 | 706 | 17 |
| B28, A28, B9, B3, E5 | 424 | 23 |
| B28, B22, B16, B9, B4, A23, E5 | 674 | 21 |
| B28, A28, A9, A23, E5 | 645 | 21 |
| B28, B22, B16, B9, B3, E5 | 521 | 23 |
| A17, A28, B9, B3, D4 | 493 | 15 |
| A17, A4, A9, A23, E5, E15, D4 | 897 | 16 |
| A17, A28, B9, C24, D4 | 589 | 19 |
| A17, A4, A9, A23, B4, B3, D4 | 808 | 15 |

As shown above, a pair of disjoint paths (e.g. two paths with no common transit links/nodes) are computed between each source node and each destination node. Topology 900A may result from aggregating all nodes and links along such computed paths as listed above.

Figure 9B:
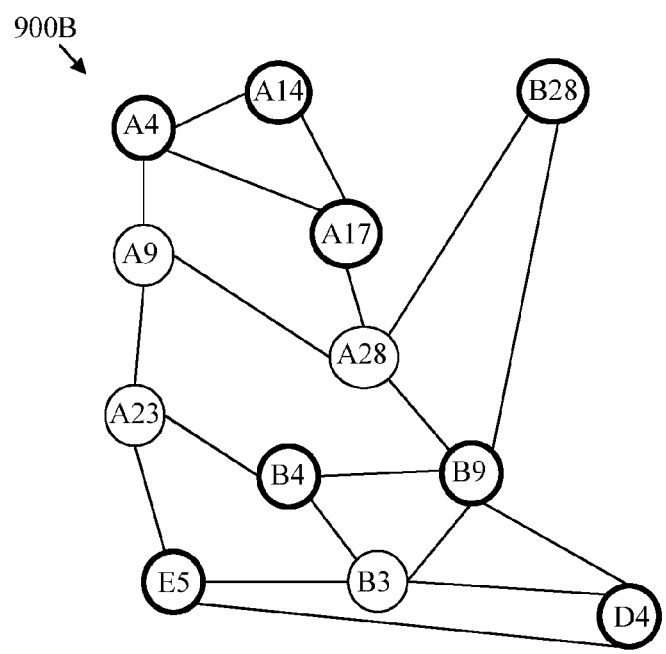
FIG. 9B is a schematic diagram of another example service specific virtual topology for a highest reliability service specific objective.

FIG. 9B is a schematic diagram of another example service specific virtual topology 900B for a highest reliability service specific objective, which may be based on service specific topology 900A. As discussed above, the service specific virtual topology base may virtualize topology 900A by removing all transit degree-2 nodes. Nodes B16, B22, C24, and E15 may each be transit nodes and may have exactly two incident links in network 900A. As such, nodes B16, B22, C24, and E15 may not be pathing decision points. Such nodes and their incident links may each be replaced with a single virtual link resulting in service specific virtual topology 900B.

Figure 10A:
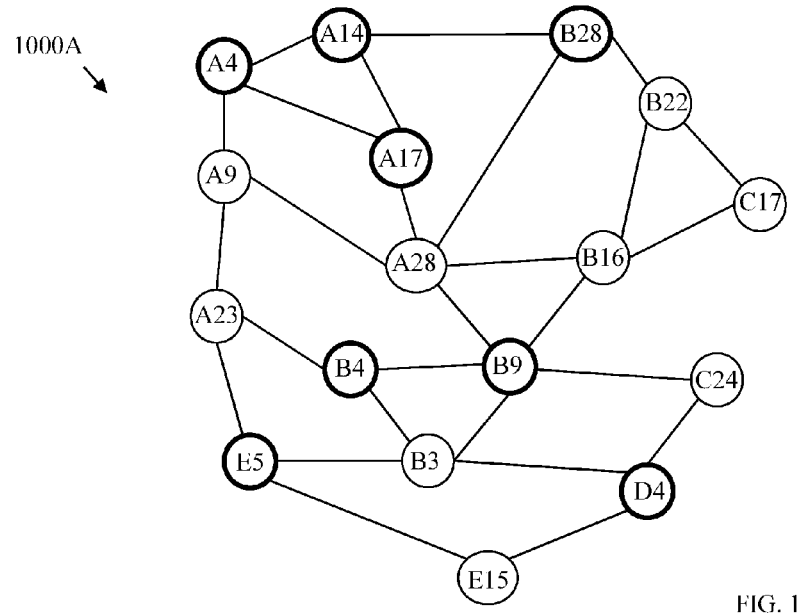
FIG. 10A is a schematic diagram of an example service specific topology for a highest reliability service specific objective when employing three disjoint paths.

FIG. 10A is a schematic diagram of an example service specific topology 1000A for a highest reliability service specific objective when employing three disjoint paths, which may be based on network 500 topology. For example, a PNC may receive substantially the same request as in network 700A and/or 800A, but may employ a k-shortest disjoint paths computation algorithm with a k value of three (e.g. three disjoint paths between each source and each destination), which may result in the following paths and associated routing costs:

| Node List | Cost | Capacity |
| --- | --- | --- |
| A4, A17, A28, B9 | 442 | 16 |
| A4, A9, A23, B4, B9 | 541 | 28 |
| A4, A17, A28, B9 | 442 | 16 |
| A4, A9, A23, B4, B3, B9 | 583 | 28 |
| A4, A17, A28, B9 | 442 | 16 |
| A4, A9, A23, E5, B3, B9 | 608 | 21 |
| A14, A17, A28, B9, B4 | 541 | 15 |
| A14, A4, A9, A23, B4 | 577 | 17 |
| A14, A17, A28, B9, B4 | 541 | 15 |
| A14, A4, A9, A23, E5, B3, B4 | 706 | 17 |
| A14, A17, A28, B9, B4 | 541 | 15 |
| A14, B28, A28, B16, B9, B3, B4 | 774 | 29 |
| B28, A28, B9, B3, E5 | 424 | 23 |
| B28, B22, B16, B9, B4, A23, E5 | 674 | 21 |
| B28, A28, A9, A23, E5 | 645 | 21 |
| B28, B22, B16, B9, B3, E5 | 521 | 23 |
| B28, A28 | 111 | 37 |
| B28, B22, C17, B16, B9, B3, E5 | 675 | 15 |
| A17, A28, B9, B3, D4 | 493 | 15 |
| A17, A4, A9, A23, E5, E15, D4 | 897 | 16 |
| A17, A28, B9, C24, D4 | 589 | 19 |
| A17, A4, A9, A23, B4, B3, D4 | 808 | 15 |
| A17, A28, B9, B3, D4 | 493 | 15 |
| A17, A4, A9, A23, E5, B3 | 695 | 16 |

As shown above, three disjoint paths (e.g. three paths with no common transit links/nodes) are computed between each source node and each destination node. Topology 1000A may result from aggregating all nodes and links along such computed paths as listed above.

Figure 10B:
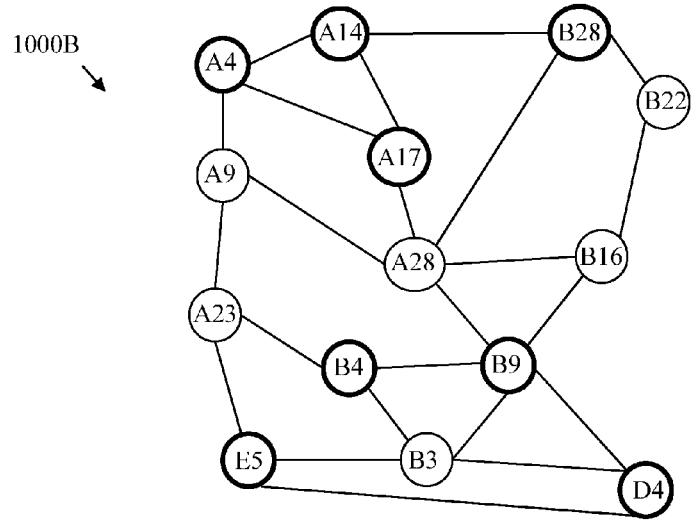
FIG. 10B is a schematic diagram of an example service specific virtual topology for a highest reliability service specific objective when employing three disjoint paths.

FIG. 10B is a schematic diagram of an example service specific virtual topology 1000B for a highest reliability service specific objective when employing three disjoint paths, which may be based on service specific topology 1000A. As discussed above, the service specific virtual topology base may virtualize topology 1000A by removing all transit degree-2 nodes. Nodes C17, C24, and E15 may each be transit nodes and may have exactly two incident links in network 1000A. As such, nodes C17, C24, and E15 may not be pathing decision points. Such nodes and their incident links may each be replaced with a single virtual link resulting in service specific virtual topology 1000B.

As discussed above, network 500 topology may represent a full physical topology. Assuming that a client application only needs four pairs of communication nodes: (A4, B9), (A14, B4), (B28, E5), (A17, D4), networks 600A, 700A, 800A, 900A and 1000A may represent different topologies generated by a k-shortest path algorithm for different objectives of optimization, for example lowest latency, lowest cost, and highest reliability. The resulting graphs may show different topology abstractions depending on the objective function. Such graphs and/or networks 600B, 700B, 800B, 900B and/or 1000B may also result in pruning irrelevant nodes and links from network 500. These example networks may show a use of objective functions, constraints, information hiding, and/or reduction to represent client service specific topology abstraction.

In summary, there may be a number of factors to consider in VNT formulation. Such factors may include the granularity of VNT, for example an endpoint only view (e.g. lowest granularity) and/or a view with varying levels of granularity. Such factors may also include objective function of the topology, for example a general request with no particular objective function associated with the topology, a service specific request with a service specific objective such as latency minimal path, reliable path, max reservable bandwidth path, etc., and/or a request with multi objectives (e.g. a combination of multiple service specific objectives). Another factor to consider may include information hiding and reduction, which may be subject to a policy of the service provider and/or negotiation between client and service providers. Such information details may depend on a pricing model. For example, the willingness to pay more for details may be considered in the service provider's pricing model.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g. from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_1+k*(R_u-R_1)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Unless otherwise stated, the term "about" means±10% of the subsequent number. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

We claim:

1. A computer program product comprising computer executable instructions stored on a non-transitory computer readable medium such that when executed by a processor cause a service specific virtual topology base, positioned in a network stratum, to:

receive a virtual service negotiation initiation message from an application stratum component, wherein the virtual service negotiation initiation message comprises a plurality of network source addresses, a plurality of network destination addresses, and a service specific objective;

obtain a plurality of computed network paths that traverse a network stratum of a network via a plurality of Network Elements (NEs), the plurality of computed network paths extending between a plurality of network source nodes associated with the network source addresses and a plurality of network destination nodes associated with the network destination addresses and meeting the service specific objective; and calculate a service specific virtual topology that abstractly represents the computed network paths, wherein calculating the service specific virtual topology comprises:

deriving a service specific network topology that includes the plurality of computed network paths; and replacing all transit degree-2 nodes in the derived service specific network topology with virtual links.

2. The computer program product of claim 1, wherein obtaining the plurality of computed network paths comprises transmitting a path computation request requesting a network control component compute paths between the plurality of network source addresses and the plurality of network destination addresses using a k-shortest paths algorithm.

3. The computer program product of claim 2, wherein the service specific objective comprises lowest latency, and wherein the path computation request requests performance of the k-shortest paths algorithm based on network link delay.

4. The computer program product of claim 2, wherein the service specific objective comprises lowest monetary cost, and wherein the path computation request requests performance of the k-shortest paths algorithm based on network link cost.

5. The computer program product of claim 2, wherein the service specific objective comprises highest reliability, and wherein the path computation request requests performance of the k-shortest paths algorithm as a k-shortest disjoint paths algorithm.

6. An apparatus comprising:

a receiver configured to receive a virtual network service initiation request message from an application stratum component, wherein the virtual network service initiation request message comprises one or more source addresses, one or more destination addresses, and a service specific objective;

a processor coupled to the receiver and configured to calculate a service specific virtual topology that abstractly represents a network stratum of a network, the network comprising network elements (NEs) and the network connecting the NEs by the one or more source addresses and the one or more destination addresses and based on the service specific objective; and a transmitter coupled to the processor and configured to transmit the service specific virtual topology to the application stratum component, wherein the processor is further configured to calculate the service specific virtual topology by:

generating a service specific topology comprising a plurality of computed network paths between the NEs with one or more source addresses and the NEs with one or more destination addresses such that the computed network paths meet the service specific objective; and virtualizing the service specific topology by replacing at least one transit degree-2 node from the service specific topology with a virtual link.

7. The apparatus of claim 6, wherein the plurality of computed network paths are obtained from a network control component.

8. The apparatus of claim 7, wherein the network control component comprises an Internet Protocol (IP) routing management device, a Generalized Multi-Protocol Label Switching (GMPLS) routing management device, an Ethernet Management Information Base (MIB), or combinations thereof.

9. The apparatus of claim 6, wherein the transit degree-2 node comprises a non-terminal network node that is traversed by at least one of the plurality of computed network paths and is connected to exactly two links that are traversed by the at least one of the plurality of computed network paths that traverses the non-terminal network node.

10. The apparatus of claim 7, wherein the service specific objective comprises lowest monetary cost, lowest latency, highest bandwidth, highest reliability, or combinations thereof.

11. The apparatus of claim 6 further comprising a memory coupled to the processor and configured to store the service specific virtual topology.

12. The apparatus of claim 6, wherein the application stratum component comprises a data center controller, wherein the one or more source addresses and the one or more destination addresses are associated with data centers controlled by the data center controller, and wherein the service specific virtual topology is transmitted to initiate a data transfer between data centers across a network domain associated with the apparatus.

13. The apparatus of claim 6, wherein the application stratum component is positioned in a first network domain, and wherein the service specific virtual topology describes a second network domain.

14. The apparatus of claim 6, wherein the apparatus is configured to operate in the network stratum and not configured to operate in the application stratum.

* * * * *